R. KLINGER.
WATER AND LIKE GAGE FITTING.
APPLICATION FILED SEPT. 27, 1910.
1,067,661.
Patented July 15, 1913.
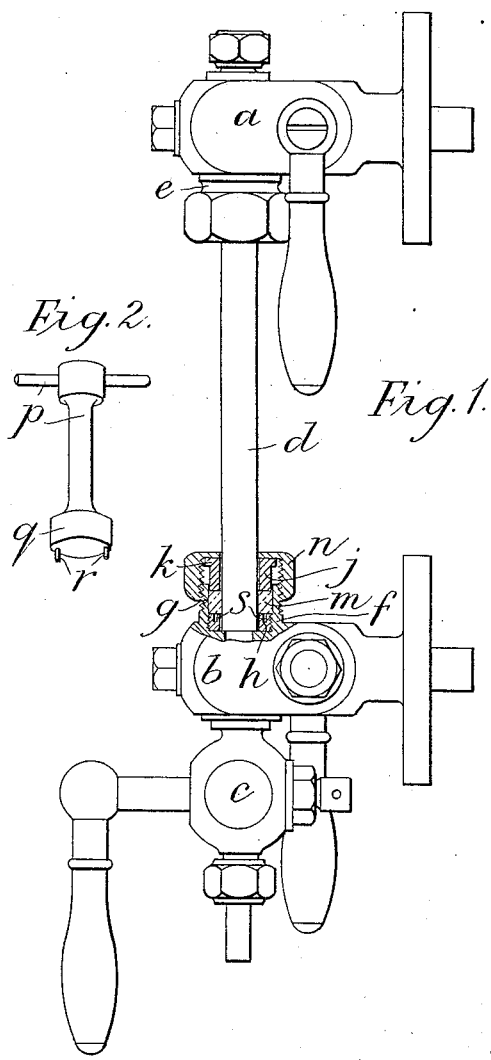
Witnesses:
E. R. Peck
L. L. Burket
Inventor:
Richard Klinger
by Hubert Peck
atty.

UNITED STATES PATENT OFFICE.

RICHARD KLINGER, OF GUMPOLDSKIRCHEN, NEAR VIENNA, AUSTRIA-HUNGARY.

WATER AND LIKE GAGE FITTING.

1,067,661.  Specification of Letters Patent.  Patented July 15, 1913.

Application filed September 27, 1910. Serial No. 584,113.

*To all whom it may concern:*

Be it known that I, RICHARD KLINGER, a subject of the Emperor of Austria-Hungary, residing at Gumpoldskirchen, near Vienna, Lower Austria, Austria-Hungary, have invented Improvements in Water and Like Gage Fittings, of which the following is a specification.

This invention relates particularly to fittings for water gages and in general to all devices in which the level of any liquid in any description of vessel or container is shown by means of a tube of glass or other substance and has for its object to render such fittings readily adaptable for use with glass or other tubes of different diameters without necessitating the removal of such fittings from their position on the boiler or container and thus enable gage fittings of one standard size to be adapted to fit any of a number of different sizes of tubes which it may be desired to use or which may be available.

Now according to this invention, in each of the cock branches of gage cocks in which the sight tube is mounted in a branch formed with a shouldered hole, there is provided for each branch a number of ferrules or liners which are adapted to be fitted into the larger part of the hole so as to adjust the effective diameter of the same to suit the particular size of tube which it is desired to use or which is available. The said ferrules or liners are readily removable so that the cock fittings can be easily altered to suit a tube of any of the various different sizes.

Figure 1 of the accompanying illustrative drawings shows partly in elevation and partly in central vertical section one construction of water gage boiler fittings according to this invention. Fig. 2 illustrates a tool hereinafter referred to.

$a$ is the steam inlet cock, $b$ the water inlet cock and $c$ the blow off cock.

$d$ indicates the sight tube mounted at its upper end in the externally screw-threaded branch $e$ of the cock $a$ and at its lower end in the similar branch $f$ of the cock $b$. The branches $e$ and $f$ are each bored out at $g$ to a diameter corresponding to the largest tube $d$ employed in such fittings. The lower part of the bore $g$ is screw threaded to receive an externally screw threaded ferrule or liner $h$. A number of interchangeable ferrules or liners $h$ are provided each one being bored to freely fit the outside diameter of a particular size of sight tube. Within the outer end of the bore $g$ is freely fitted a gland $j$ flanged at $k$ as usual. A number of these glands are provided each one being bored to freely fit a particular size of sight tube $d$. Between the ferrule or liner $h$ and the gland $j$ is arranged the usual rubber or composition ring $m$ which is forced against the tube $d$ when the gland nut $n$ is screwed on the corresponding branch $e$ or $f$. The nut $n$ and ring $m$ may be changed to suit the particular gland used.

For the purpose of readily removing one ferrule or liner $h$ when it is desired to insert another, a tool such as shown in Fig. 2 is provided. This tool comprises a handle $p$ and a boss $q$ furnished with two projecting pins $r$ adapted to fit suitable holes $s$ formed therefor in each ferrule or liner $h$. The boss $q$ fits freely within the bore $g$ which thereby constitutes a guide for the tool when screwing a ferrule or liner $h$ into or out of position.

What I claim is:—

In a gage fitting, a branch having a hole that is formed with a shoulder to support a gage tube and screw threaded externally and internally above the shoulder, a screw ferrule adapted to be screwed into the hole of said branch and bored throughout its length to fit over a gage tube, a stuffing box gland of the same bore as the said ferrule, and a stuffing box nut of the same bore as the said ferrule and the said gland adapted to screw on said branch and bear on said gland.

Signed at Vienna, Austria-Hungary, this third day of September 1910.

RICHARD KLINGER.

Witnesses:
 ADA MARIA BERGER,
 AUGUST FUGGER.

Copies of this patent may be obtained for five cents each, by addressing the "Commissioner of Patents, Washington, D. C."